US012801537B2

(12) United States Patent
Ndu et al.

(10) Patent No.: US 12,801,537 B2
(45) Date of Patent: Nov. 17, 2026

(54) INTEGRITY MONITORING OF ENCRYPTED OPERATING SYSTEM INFORMATION

(71) Applicant: Hewlett Packard Enterprise Development LP, Spring, TX (US)

(72) Inventors: Geoffrey Ndu, Bristol (GB); Theofrastos Koulouris, Bristol (GB); Nigel John Edwards, Bristol (GB)

(73) Assignee: Hewlett Packard Enterprise Development LP, Spring, TX (US)

( * ) Notice: Subject to any disclaimer, the term of this patent is extended or adjusted under 35 U.S.C. 154(b) by 29 days.

(21) Appl. No.: 19/041,284

(22) Filed: Jan. 30, 2025

(65) Prior Publication Data

US 2026/0220052 A1 Jul. 30, 2026

(51) Int. Cl.

| | |
|---|---|
| ***G06F 12/128*** | (2016.01) |
| ***G06F 12/14*** | (2006.01) |
| ***G06F 13/28*** | (2006.01) |

(52) U.S. Cl.

CPC .......... *G06F 12/1408* (2013.01); *G06F 13/28* (2013.01); *G06F 2212/1052* (2013.01)

(58) Field of Classification Search

None

See application file for complete search history.

(56) References Cited

U.S. PATENT DOCUMENTS

| | | | | |
|---|---|---|---|---|
| 11,017,080 | B2 | 5/2021 | Ndu et al. | |
| 11,714,910 | B2 | 8/2023 | Ndu et al. | |
| 11,803,639 | B2 | 10/2023 | Ndu et al. | |
| 12,204,639 | B2 | 1/2025 | Ndu et al. | |
| 2006/0047972 | A1* | 3/2006 | Morais | G06F 12/145 713/181 |
| 2012/0102333 | A1* | 4/2012 | Wong | G06F 21/60 713/189 |
| 2018/0081829 | A1* | 3/2018 | Kaplan | G06F 12/1408 |

(Continued)

OTHER PUBLICATIONS

"Extended Asm (Using the GNU Compiler Collection (GCC)", available online at <https://web.archive.org/web/20240417071348/https://gccgnu.org/onlinedocs/gcc/Extended-Asm.html#Goto-Labels>, Apr. 17, 2024, 23 pages.

(Continued)

*Primary Examiner* — Kaveh Abrishamkar

(74) *Attorney, Agent, or Firm* — Trop, Pruner & Hu, P.C.

(57) ABSTRACT

In some examples, a system identifies a memory page containing encrypted operating system (OS) information that is to be subjected to integrity monitoring, the encrypted OS information encrypted with a first key. The system associates an encryption disabled indicator with the memory page. The system requests the encrypted OS information from the memory page, wherein the request is to cause a central processing unit (CPU) to read the encrypted OS information from the memory page, and the encryption disabled indicator is to cause the CPU to refrain from decrypting the encrypted OS information using the first key when reading the encrypted OS information from the memory page. The system computes a reference measurement value based on the encrypted OS information read by the CPU from the memory page without decryption using the first key, the reference measurement value for use in the integrity monitoring.

19 Claims, 6 Drawing Sheets

(56) References Cited

U.S. PATENT DOCUMENTS

2019/0384918 A1* 12/2019 Ndu ...................... G06F 21/575

OTHER PUBLICATIONS

AMD, "AMD Secure Encrypted Virtualization (SEV)", available online at <https://www.amd.com/en/developer/sev.html>, 2025, 7 pages.

Apple Inc, "Private Cloud Compute: A new frontier for AI privacy in the cloud", available online at <https://security.apple.com/blog/private-cloud-compute/>, Jun. 10, 2024, 6 pages.

ARM, "Learn the architecture—Introducing Arm Confidential Compute Architecture Version 3.0", available online at <https://developer.arm.com/documentation/den0125/latest>, 2025, 4 pages.

Azure, "Agentless machine scanning", available online at <https://learn.microsoft.com/en-US/azure/defender-for-cloud/concept-agentless-data-collection>, Feb. 19, 2025, 6 pages.

Consortium, "Confidential Computing: Hardware-Based Trusted Execution for Applications and Data ", Nov. 2022, V1.3, 15 Pages.

Hunt, " Confidential computing for OpenPOWER ", EuroSys '21: Sixteenth European Conference on Computer Systems, Apr. 26-28, 2021, 17 Pages.

IBM, "What is IBM Secure Execution? ", available online at <https://www.ibm.com/docs/en/linux-on-systems?topic=execution-introduction>, Jan. 13, 2025, 2 pages.

Intel, " Intel® Trust Domain Extensions (Intel® TDX)", available online at <https://web.archive.org/web/20240828190237/https://www.intel.com/content/www/us/en/developer/tools/trust-domain-extensions/overview. html>, Aug. 28, 2024, 7 pages.

Intel, "Runtime Encryption of Memory with Intel® Total Memory Encryption-Multi-Key (Intel® TME-MK) ", available online at <https://web.archive.org/web/20240420201902/https://www.intel.com/content/www/US/en/developer/articles/ news/runtime-encryption-of-memory-with-intel-tme-mk.html>, Apr. 20, 2024, 11 pages.

Jonathan Corbet, "Jump label", available online at <https://lwn.net/Articles/412072/>, Oct. 27, 2010, 4 pages.

Kai Huang, "Protect Data of Virtual Machines with MKTME on KVM", KVM Forum, 2018, 20 Pages.

Kaplan et al., "AMD Memory Encryption", White Paper, Oct. 18, 2021, 12 pages.12 pages.

NVIDIA, "DOCA Documentation v2.10.0 ", available online at <https://docs.nvidia.com/doca/sdk/doca+app+shield/index.html>, 2025, 21 pages.

Sahita et al., "CoVE: Towards Confidential Computing on RISC-V Platforms", 2023, 7 pages.

Wade Holmes, "Ensuring Good with VMware AppDefense ", available online at <https://blogs.vmware.com/networkvirtualization/2017/09/ensuring-good-appdefense.html/>, Sep. 5, 2017, 13 pages.

Wikipedia, "Input-output memory management unit", available online at <https://en.wikipedia.org/w/index.php?title=Input%E2%80%93output_memory_management_unit&oldid=1242251280>, Aug. 25, 2024.

* cited by examiner

INTEGRITY MONITORING OF ENCRYPTED OPERATING SYSTEM INFORMATION

BACKGROUND

A computing system can include an operating system (OS) that manages resources of the electronic device. The resources include hardware resources, program resources, and other resources. The OS includes a kernel, which is the core of the OS and performs various tasks, including controlling hardware resources, arbitrating conflicts between processes relating to the resources, managing file systems, performing various services for parts of the electronic device, including other parts of the OS, and so forth.

BRIEF DESCRIPTION OF THE DRAWINGS

Some implementations of the present disclosure are described with respect to the following figures.

Figure 1:
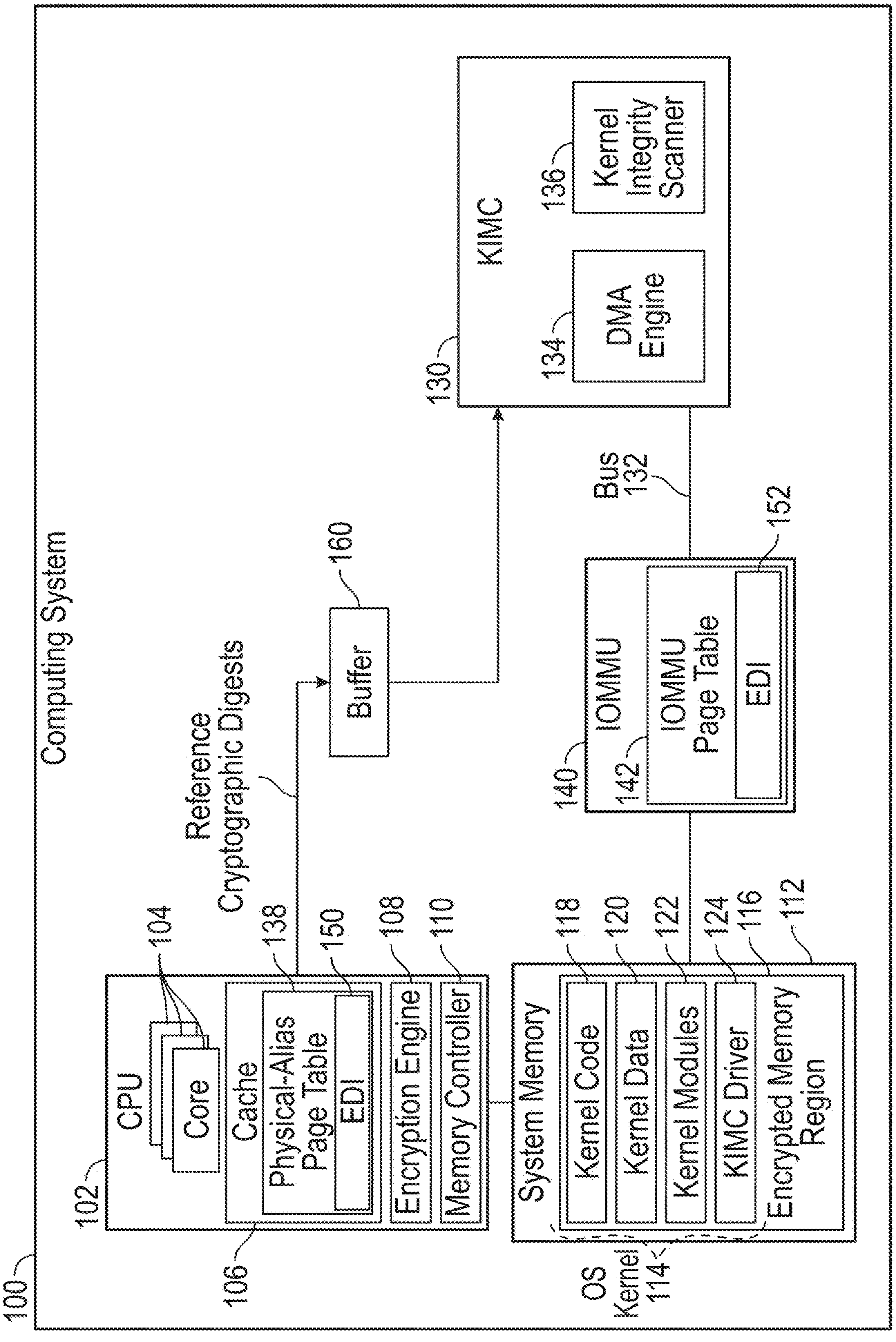
FIG. 1 is a block diagram of a computing system including a kernel integrity monitoring controller (KIMC) for verifying kernel integrity based on encrypted operating system (OS) information, in accordance with some examples.

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION

An operating system (OS), including its kernel, may be corrupted or compromised. For example, malware may insert malicious code into the kernel or otherwise modify the kernel. Alternatively, a kernel may be corrupted when errors are introduced into the kernel, such as due to malfunction of hardware or machine-readable instructions. Kernel integrity monitoring systems may rely on accessing unencrypted memory regions containing kernel information that is the subject of integrity checking. An "unencrypted memory region" is a region of a memory in which the information stored in the region is not encrypted.

However, memory encryption is becoming increasingly widespread. For example, a central processing unit (CPU) may implement memory encryption by encrypting information in an external memory connected to the CPU. The external memory can refer to memory that is outside of the CPU, as compared to a memory (e.g., a cache memory) inside the CPU. Memory encryption may provide the foundation for implementing confidential computing, in which data and program code are protected during processing by using hardware-based, attested trusted execution environments (TEEs).

A kernel integrity monitoring system may include a bus device that has direct memory access (DMA) to a memory containing kernel information that is the subject of kernel integrity monitoring. The bus device may include a scanner that retrieves kernel information from memory regions of the memory and verifies the integrity of the retrieved kernel information. If memory encryption is implemented, then the kernel information stored in the memory is encrypted. In some cases, when encrypted kernel information is retrieved, the encrypted kernel information may be decrypted when read from the memory by the bus device for applying the kernel integrity checking. However, this may raise security concerns since the decrypted kernel information is exposed over a bus to the bus device. The exposed decrypted kernel information may be accessible to unauthorized entities, such as malware or any other unauthorized entity.

In accordance with some implementations of the present disclosure, an OS integrity monitoring system is able to set an encryption disabled indicator (EDI) in association with a memory region containing encrypted OS information (including encrypted kernel information) that is the subject of integrity monitoring. In some examples, the EDI indicates that the memory region is read-only and encryption and decryption of the memory region are disabled on store (write) and load (read) operations of the memory region. The EDI causes a CPU or a memory management unit to refrain from decrypting the encrypted OS information using a given encryption key when the encrypted OS information is read for the purpose of computing a cryptographic digest as part of the OS integrity monitoring. The EDI indicates to the CPU or the memory management unit that the content of the memory region is not to be encrypted and thus the CPU or the memory management unit should not decrypt the content when reading from the memory region.

In further examples, the encrypted OS information is encrypted with a first encryption key, KEY0, and the EDI indicates that the memory region is read-only and encrypted with a second encryption key, KEY1, that is different from the first encryption key. In such further examples, the EDI indicates to the CPU that the content of the memory region is encrypted with the second encryption key and thus the CPU should decrypt the content using the second encryption key when reading from the memory region. Note however that the CPU does not decrypt the content with the first encryption key; as a result, the encrypted OS information remains encrypted with the first encryption key. In these further examples, the EDI effectively indicates that encryption and decryption of the memory region using the first encryption key are disabled (even though the memory region is encrypted and decrypted using the second encryption key).

An "encryption disabled indicator" or "EDI" can refer to a flag, an information element, or any other value that indicates that content of a memory region is not to be decrypted with a specific encryption key (e.g., KEY0) when reading the content from the memory region.

FIG. 1 is a block diagram of a computing system 100, which can be implemented using one or more computers. The computing system 100 includes a CPU 102 that has a number of processing cores 104. The CPU may be in the form of a system on a chip (SoC) or an integrated circuit device or any other type of hardware device.

The CPU 102 includes a cache memory 106, an encryption engine 108, and a memory controller 110 that manages access (read access and write access) of a system memory 112. The cache memory 106 may include one or more levels of cache memories.

In response to read or write requests from a processing core 104, the memory controller 110 issues read or write commands to the system memory 112 to perform the requested read or write operations. The system memory 112 is external of the CPU 102, and the system memory 112 can be implemented using one or more memory devices.

Program code (including machine-readable instructions such as software or firmware) can be executed on the processing cores 104 of the CPU 102. Although just one the CPU is shown in FIG. 1, the computing system 100 may include multiple CPUs in other examples.

The cache memory 106 is used to store a portion of data that is also stored in the system memory 112. A processing core 104 can access data in the cache memory 106 more quickly (i.e., with less latency) than from the system memory 112.

The encryption engine 108 encrypts data that is to be written to the system memory 112 in response to write requests from the processing cores 104. The encryption engine 108 encrypts data using one or more encryption keys. An encryption key used by the encryption engine 108 is generated in the CPU 102 and is inaccessible to any entity that is outside the CPU 102. In some examples, the encryption applied by the encryption engine 108 can be according to an Advanced Encryption Standard (AES) algorithm, such as the AES-XTS algorithm, where XTS stands for "XEX Tweakable Block Cipher with Ciphertext Stealing." In other examples, other types of encryption algorithms can be employed.

Encrypted data read by the memory controller 110 from the system memory 112 is provided to the encryption engine 108 for decryption. The decrypted data is then provided to a processing core 104 and/or stored in the cache memory 106.

As noted above, memory encryption is used to implement confidential computing for protecting data and program code during operations of the CPU 102. Confidential computing can prevent unauthorized access of the data and the program code.

In some examples, the system memory 112 stores kernel information of an OS kernel 114. The kernel information is stored in encrypted form in an encrypted memory region 116 of the system memory 112. The encrypted memory region 116 can refer to a single encrypted memory region or multiple encrypted memory regions.

The encrypted kernel information includes executable kernel code 118 that is loaded for execution by the CPU 102 to perform tasks of the OS kernel 114, kernel read-only data 120 that is not expected to be changed, and kernel modules 122. The read-only data 120 can include configuration information or other information that controls operations of the OS kernel 114. A "kernel module" refers to a piece of program code that can be loaded to or unloaded from the OS kernel 114. In further examples, the encrypted kernel information can include other types of kernel information.

The computing system 100 also includes a kernel integrity monitoring controller (KIMC) 130 according to some examples of the present disclosure. The KIMC 130 monitors certain kernel information of the OS kernel 114 to detect whether a kernel integrity violation has occurred. The monitored kernel information includes information of the OS kernel 114 that is not expected to be changed (aside from authorized updates).

The KIMC 130 can determine the occurrence of a kernel integrity violation if the KIMC 130 detects modification of any part of the kernel information (where the modification of the kernel information is not expected). In some examples, the KIMC 130 is implemented using a management controller such as a baseboard management controller (BMC) that performs management tasks in the computing system 100. In other examples, the KIMC 130 is implemented using other controllers, including microcontrollers, or any other hardware processing circuitry. The KIMC 130 is separate from the CPU 102.

The KIMC 130 can access the system memory 112 over a bus 132. In some examples, the bus 132 is a Peripheral Component Interconnect Express (PCIe) interconnect. In other examples, the bus 132 can be a different type of communication link. The KIMC 130 includes a direct memory access (DMA) engine 134 to access the system memory 112 over the bus 132 using a DMA transfer. The DMA engine 134 accesses data in the system memory 112 without involving the CPU 102 in the data access.

An input/output memory management unit (IOMMU) 140 is also connected to the bus 132 between the KIMC 130 and the system memory 112. An IOMMU is a memory management unit (MMU) that connects a bus (e.g., the bus 132) that supports DMA operations to a memory (e.g., the system memory 112). The IOMMU 140 stores an IOMMU page table 142 that maps virtual addresses visible to bus devices (including the KIMC 130) to physical addresses of memory pages of the system memory 112. A "memory page" or a "page" of memory can refer to any segment of the memory.

The IOMMU 140 also protects the system memory 112 from unauthorized access of the system memory 112 by bus devices. To read data from the system memory 112, the KIMC 130 provides a virtual address to the IOMMU 140, which translates the virtual address to a physical address from which the data is read from the system memory 112.

The KIMC 130 includes a kernel integrity scanner 136 that uses the DMA engine 134 to obtain encrypted kernel information (including the executable kernel code 118, the kernel read-only data 120, and the kernel modules 122) from the encrypted memory region 116. The kernel integrity scanner 136 performs kernel integrity monitoring based on the encrypted kernel information read from the system memory 112 through the IOMMU 140. The encrypted kernel information is not decrypted by the IOMMU 140 so that decrypted kernel information is not exposed on the bus 132. The IOMMU 140 does not decrypt the encrypted kernel information based on an EDI 152 set in the IOMMU page table 142 (discussed further below in connection with Table 2).

The kernel integrity scanner 136 computes measurement values based on the encrypted kernel information read from the system memory 112. A measurement value based on encrypted kernel information can be derived by applying a function on the encrypted kernel information. The function can be a cryptographic hash function, which when applied to the encrypted kernel information produces a hash value (referred to as a cryptographic digest). An example of a cryptographic hash function is a Secure Hash Algorithm (SHA) function. The hash function may be applied by the kernel integrity scanner 136 to different pieces of the encrypted kernel information, e.g., the kernel code 118, the kernel read-only data 120, and the kernel modules 122 to produce respective cryptographic digests.

The kernel integrity scanner 136 compares the calculated measurement values to reference measurement values (e.g., reference cryptographic digests) received from a KIMC driver 124 executed by the CPU 102. The KIMC driver 124 is part of the OS kernel 114.

The KIMC driver 124 when executed by the CPU 102 reads the encrypted kernel information from the system memory 112. In accordance with some examples of the present disclosure, the CPU 102 does not decrypt the encrypted kernel information based on an EDI 150 set in a CPU page table (referred to as a "physical-alias page table 138" and discussed further below in connection with Table 1) in the CPU 102. The physical-alias page table 138 can be stored in the cache memory 106. The KIMC driver 124 generates reference measurement values based on the encrypted kernel information in the encrypted memory region 116, and the KIMC driver 124 sends the reference measurement values to the KIMC 130. The kernel integrity scanner 136 compares the calculated measurement values (calculated by the kernel integrity scanner 136) to the reference measurement values from the KIMC driver 124. Note that without the physical-alias page table 138, the KIMC driver 124 would read the kernel information decrypted. However, the physical-alias page table 138 with the EDI 150 set would cause the kernel information to remain encrypted when read by the KIMC driver 124.

If the calculated measurement values match the reference measurement values, then the kernel integrity scanner 136 makes a determination that the integrity of the OS kernel 114 has not been violated. However, if any of the calculated measurement values do not match the reference measurement values, then the kernel integrity scanner 136 makes a determination that the integrity of the OS kernel 114 has been violated. The violation of the OS kernel integrity may be based on an unauthorized modification of the kernel information by malware or another attacker. Alternatively, the violation of the OS kernel integrity may be due to an error in the computing system 100.

Note that the KIMC 130 can use measurement values based on encrypted kernel information because the integrity monitoring is based on detecting whether kernel information in the system memory 112 has changed. The KIMC 130 does not interpret the kernel information itself.

Table 1 below shows an example of the physical-alias page table 138 that maps physical addresses to alias virtual addresses. A virtual address refers to a virtual page, and a physical address refers to a physical page in the system memory 112. A "page table" can refer to any mapping information with entries that map respective virtual addresses to physical addresses.

TABLE 1

(Physical-Alias Page Table)

| Physical Page | Alias Virtual Page | EDI |
|---|---|---|
| Kernel Physical Address 1 | Alias Virtual Address A | 1 |
| Kernel Physical Address 2 | Alias Virtual Address B | 1 |
| | . . . | |

In the example physical-alias page table 138 of Table 1, a first entry maps kernel physical address 1 to alias virtual address A, a second entry maps kernel physical address 2 to alias virtual address B, and so forth. In some examples of the present disclosure, each entry of the physical-alias page table 138 includes an EDI that when set to a specified value (e.g., "1" or another value) indicates that the content of the memory page referred to by the respective physical address is unencrypted. Note that the EDI may also indicate that the memory page referred to by the respective physical address is read-only (i.e., the memory page cannot be written to).

Each of the first and second entries of the physical-alias page table 138 of Table 1 has EDI set to "1" to indicate that encryption and decryption of the content of the memory pages referred to by the kernel physical addresses 1 and 2 are disabled on store (write) and load (read) operations of the memory region. If EDI in an entry of the physical-alias page table 138 is unset (e.g., "0" or another value), then that indicates encryption and decryption of the content of the memory page referred to by the respective physical address is enabled on store and load operations.

A "kernel physical address" refers to a memory page that contains a piece of kernel information. An "alias virtual address" refers to a virtual address that is in addition to another virtual address that maps to the same physical address. For example, the OS kernel 114 may use kernel virtual addresses to access respective pieces of kernel information in respective memory pages. The alias virtual addresses of Table 1 are aliases that also map to the same respective memory pages. The KIMC driver 124 is to perform cryptographic hashing of memory pages referred to by the alias virtual addresses to produce reference cryptographic digests that are then sent to the KIMC 130.

If an entry of the physical-alias page table 138 has EDI set to "1," the CPU 102 does not decrypt the content of the memory page referred to by the respective kernel physical address when reading encrypted kernel information from the respective memory page. This allows the KIMC driver 124 to apply a function on the encrypted kernel information to produce a reference measurement value.

Table 2 below sets forth an example of the IOMMU page table 142 of the IOMMU 140.

TABLE 2

(IOMMU Page Table)

| I/O Virtual Page | Physical Page | EDI |
|---|---|---|
| Device Virtual Address A | Kernel Physical Address 1 | 1 |
| Device Virtual Address B | Kernel Physical Address 2 | 1 |
| | . . . | |

The IOMMU page table 142 has entries that map device virtual addresses (which are I/O virtual addresses visible to a bus device such as the KIMC 130) to respective physical addresses. The first entry of the IOMMU page table 142 maps device virtual address A to kernel physical address 1, the second entry of the IOMMU page table 142 maps device virtual address B to kernel physical address 2, and so forth.

In some examples of the present disclosure, each entry of the IOMMU page table 142 includes an EDI that when set to a specified value (e.g., "1" or another value) indicates that encryption and decryption of the content of the memory page referred to by the respective physical address are disabled on store (write) and load (read) operations of the memory region. Note that the EDI may also indicate that the memory page referred to by the respective physical address is read-only (i.e., the memory page cannot be written to).

Each of the first and second entries of the IOMMU page table 142 of Table 2 has EDI set to "1" to indicate that encryption and decryption of the content of the memory pages referred to by the kernel physical addresses 1 and 2 are disabled. If an entry of the IOMMU page table 142 has EDI set to "1," the IOMMU 140 does not decrypt the content of the memory page referred to by the respective kernel physical address when reading encrypted kernel information from the respective memory page. This allows the kernel integrity scanner 136 in the KIMC 130 to apply a function on the encrypted kernel information read in a DMA transfer to produce a calculated measurement value to compare to a reference measurement value received from the KIMC driver 124 of the OS kernel 114.

Note that the kernel integrity scanner 136 is able to perform kernel integrity scanning of either encrypted or unencrypted kernel information. In a computing system in which data in a system memory is not encrypted, the kernel integrity scanner 136 can read, in a DMA transfer, unencrypted kernel information from the system memory, apply a function on the unencrypted kernel information to produce a calculated measurement value, and compare the calculated measurement value to a reference measurement value that is also computed based on the unencrypted kernel information.

Encrypted Kernel Information and Unencrypted I/O

In some examples, unencrypted I/O operations are used by the KIMC 130 to retrieve encrypted kernel information from the system memory 112. An unencrypted I/O operation is an I/O operation, such as over the bus 132, in which data of the I/O operation is not encrypted. In the case where encrypted kernel information is being read over the bus 132, an unencrypted I/O operation does not further encrypt the encrypted kernel information.

In the ensuing discussion, it is assumed that the OS kernel 114 uses a single encryption key, KEY0 (having a key identifier, KEY_ID0), to encrypt kernel information that is subject to integrity monitoring. In other examples, the OS kernel 114 may use multiple encryption keys to encrypt different pieces of the kernel information. Each encryption key, including KEY0, is generated by the CPU 102. In a DMA transfer of the encrypted kernel information encrypted with KEY0, the encrypted kernel information is not further encrypted in the DMA transfer.

Figure 2:
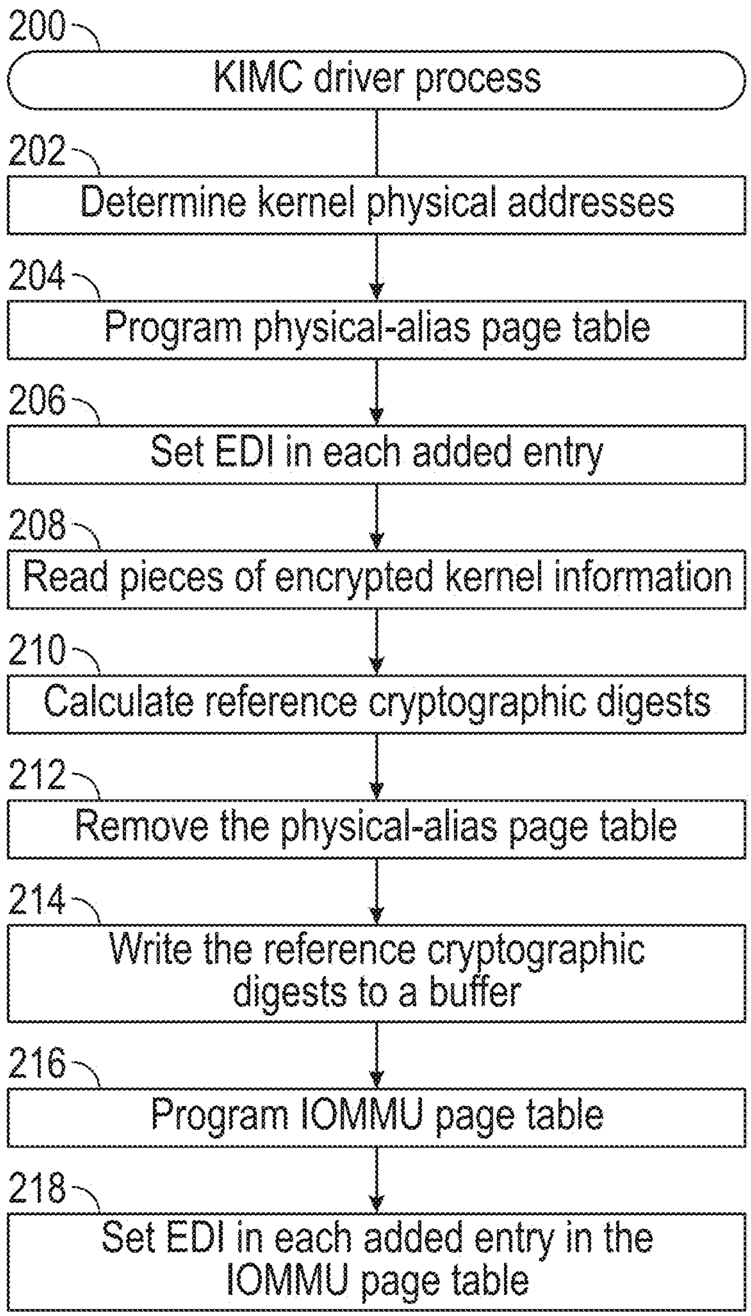
FIG. 2 is a flow diagram of a process of a driver of an OS kernel, according to some examples.

FIG. 2 is a flow diagram of an example process 200 performed by the KIMC driver 124 for supporting integrity monitoring of encrypted kernel information that is transferred in an unencrypted I/O operation (e.g., a DMA transfer) to the KIMC 130. The KIMC driver 124 determines (at 202) kernel physical addresses of memory pages of the system memory 112 containing kernel information that is the subject of integrity monitoring.

For example, memory regions to be measured for integrity monitoring are identified using kernel symbol names generated when the OS kernel 114 was compiled. A "symbol name" can include a string that represents data. For example, the kernel read-only data 120 can be in a memory region between the symbol names "_start_rodata" and "_end_rodata." The kernel symbol names identifying memory regions to be measured can be compiled into the KIMC driver 124 or supplied from a file or memory buffer.

The OS kernel 114 also maintains a symbol table that maps symbol names to kernel virtual addresses referring to virtual pages containing kernel information. The KIMC driver 124 performs a lookup of the symbol table based on the symbol names to obtain the kernel virtual addresses. Based on the kernel virtual addresses, the KIMC driver 124 performs a lookup of a kernel page table that maps kernel virtual addresses to respective kernel physical addresses. Note that in some examples entries of the physical-alias page table 138 of FIG. 1 are part of the kernel page table used by the OS kernel 114 for its operations.

The KIMC driver 124 programs (at 204) the physical-alias page table 138 by adding entries mapping the kernel physical addresses to alias virtual addresses (e.g., the entries of Table 1 above). As part of adding entries to the physical-alias page table 138, the KIMC driver 124 also sets (at 206) the EDI in each added entry for indicating that the content of the memory page represented by the added entry is unencrypted (and read-only), even though the content is actually encrypted.

The KIMC driver 124 reads (at 208) respective pieces of encrypted kernel information (e.g., 118, 120, and 122 of FIG. 1) using the alias virtual addresses. In response to the read requests from the KIMC driver 124 for data of the alias virtual addresses, the CPU 102 accesses the physical-alias page table 138 to obtain the respective kernel physical addresses. Since the EDI is set in the physical-alias page table 138 for each of the kernel physical addresses, the CPU 102 does not decrypt the pieces of encrypted kernel information when reading the pieces of encrypted kernel information from the system memory 112. As a result, the kernel information returned to the KIMC driver 124 is encrypted kernel information.

The KIMC driver 124 calculates (at 210) reference cryptographic digests by applying a cryptographic hash function on the pieces of encrypted kernel information. In some examples, after calculating the reference cryptographic digests, the KIMC driver 124 can remove (at 212) the physical-alias page table 138.

The KIMC driver 124 writes (at 214) the reference cryptographic digests to a buffer 160 (FIG. 1). The buffer 160 may have been allocated by the KIMC driver 124 for access by the KIMC 130. The buffer 160 may be allocated in the system memory 112, in a memory of the CPU 102, or a memory of the KIMC 130. The reference cryptographic digests are added to the buffer 160 along with physical addresses associated with the reference cryptographic digests and the size of each reference cryptographic digest. The KIMC 130 may be triggered to read the buffer 160 in response to an indication from the KIMC driver 124 that the buffer 160 has been populated with reference cryptographic digests.

The KIMC driver 124 programs (at 216) the IOMMU page table 142 by adding entries mapping device virtual addresses to respective kernel physical addresses (such as entries shown in Table 2). As part of adding entries to the IOMMU page table 142, the KIMC driver 124 also sets (at 218) the EDI of each added entry for indicating that the content of the memory page represented by the added entry is unencrypted (and read-only), even though the content is actually encrypted.

When the KIMC 130 reads encrypted kernel information using device virtual addresses, the IOMMU 140 does not decrypt the encrypted kernel information because the EDI is set for each piece of encrypted kernel information read in a DMA transfer. As a result, the encrypted kernel information is returned to the KIMC 130 without decryption, to allow the kernel integrity scanner 136 to calculate cryptographic digests based on the encrypted kernel information for comparison to the reference cryptographic digests received from the buffer 160.

Encrypted Kernel Information and Encrypted I/O

In further examples, encrypted I/O operations (including DMA transfers) are used by the KIMC 130 to retrieve encrypted kernel information from the system memory 112. An encrypted I/O operation is an I/O operation, such as over the bus 132, in which data that is the target of the I/O operation is encrypted.

In the ensuing discussion, it is assumed that the OS kernel 114 uses a single encryption key, KEY0 (having a key identifier, KEY_ID0), to encrypt kernel information that is subject to integrity monitoring. In other examples, the OS kernel 114 may use multiple encryption keys to encrypt different pieces of the kernel information. Each encryption key, including KEY0, is generated by the CPU 102. For data (e.g., a memory page) that may be the target of a DMA transfer, the data is also encrypted with another encryption key, KEY1 (having a key identifier, KEY_ID1). Thus, when the data is read in a DMA transfer, the data is decrypted using KEY1. The IOMMU page table 142 is programmed with the key identifier, KEY_ID1, of the encryption key, KEY1, so that the DMA engine 134 of the KIMC 130 can decrypt the data of the DMA transfer using KEY1.

Table 3 below shows an example of the physical-alias page table 138 that maps physical addresses to virtual addresses in examples where DMA transfers are encrypted using KEY1.

TABLE 3

(Physical-Alias Page Table)

| Physical Page | Alias Virtual Page | I/O Key Identifier |
|---|---|---|
| Kernel Physical Address 1 | Alias Virtual Address A | KEY_ID1 |
| Kernel Physical Address 2 | Alias Virtual Address B | KEY_ID1 |
| | . . . | |

In the example physical-alias page table 138 of Table 3, a first entry maps kernel physical address 1 to alias virtual address A, a second entry maps kernel physical address 2 to alias virtual address B, and so forth. In some examples of the present disclosure, each entry of the physical-alias page table 138 of Table 4 includes an I/O key identifier that when set to a specified key identifier value indicates that the content of the memory page referred to by the respective physical address is encrypted using the encryption key identified by the I/O key identifier. In the example of Table 4, the I/O key identifier included in each entry is KEY_ID1, which identifies KEY1. Note that the presence of the I/O key identifier may also indicate that the memory page referred to by the respective physical address is read-only (i.e., the memory page cannot be written to).

The I/O key identifier is another example of an EDI, in the sense that the I/O key identifier provides an indication that encryption and decryption of a memory page using encryption key KEY0 are disabled during store and load operations of the memory page, even though the memory page is encrypted and decrypted with the I/O key (e.g., KEY1) identified by the I/O key identifier.

If an entry of the physical-alias page table 138 has a set I/O key identifier (e.g., KEY_ID1), the CPU 102 decrypts, using KEY1, the content of the memory page referred to by the respective kernel physical address when reading encrypted kernel information (encrypted with KEY0) from the respective memory page. The KIMC driver 124 applies a function on a version of the encrypted kernel information (decrypted with KEY1) to produce a reference measurement value. Note that decrypting the encrypted kernel information (that was encrypted with KEY0) with KEY1 produces garbled ciphertext (not the cleartext form of the kernel information). However, note that the kernel integrity scanner 136 in the KIMC 130 would also be calculating a measurement value based on garbled ciphertext produced by decrypting the encrypted kernel information using KEY1. A match of the calculated measurement value and the reference measurement value would indicate that the kernel information has not been modified and thus no integrity violation has occurred.

Figure 3:
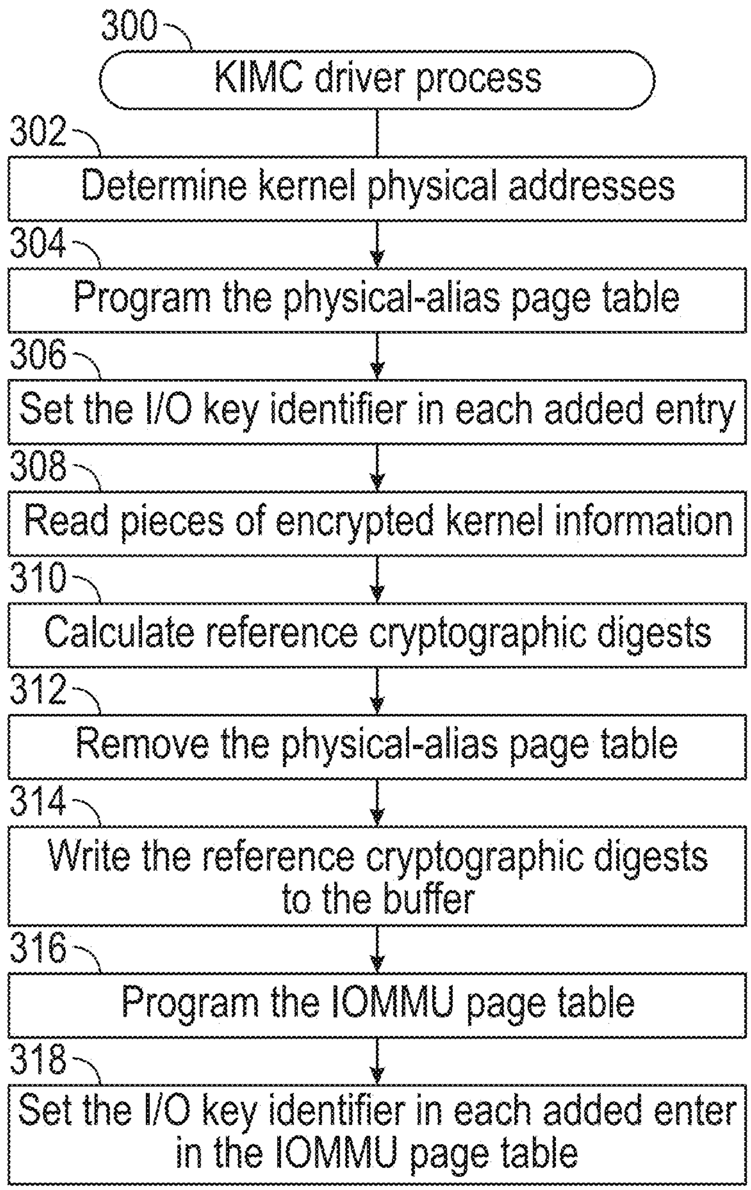
FIG. 3 is a flow diagram of a process of a driver of an OS kernel, according to further examples

FIG. 3 is a flow diagram of an example process 300 performed by the KIMC driver 124 for supporting integrity monitoring of encrypted kernel information that uses an encrypted I/O operation (e.g., an encrypted DMA transfer). The KIMC driver 124 determines (at 302) kernel physical addresses of memory pages of the system memory 112 containing kernel information that is the subject of integrity monitoring. Task 302 is similar to task 202 in FIG. 2.

The KIMC driver 124 programs (at 304) the physical-alias page table 138 by adding entries mapping the kernel physical addresses to alias virtual addresses (e.g., the entries of Table 3 above). As part of adding entries to the physical-alias page table 138, the KIMC driver 124 also sets (at 306) the I/O key identifier (e.g., KEY_ID1 that identifies KEY1) in each added entry for indicating that the content of the memory page represented by the added entry is read-only and encrypted using an encryption key identified by the I/O key identifier.

The KIMC driver 124 reads (at 308) respective pieces of encrypted kernel information (e.g., 118, 120, and 122 of FIG. 1) using the alias virtual addresses. In response to the read requests from the KIMC driver 124 for data of the alias virtual addresses, the CPU 102 accesses the physical-alias page table 138 to obtain the respective kernel physical addresses. Since the I/O key identifier is set in the physical-alias page table 138 for each of the kernel physical addresses, the CPU 102 decrypts the pieces of encrypted kernel information using the encryption key (e.g., KEY1) identified by the I/O key identifier when reading the pieces of encrypted kernel information from the system memory 112. As a result, the kernel information returned to the KIMC driver 124 is the encrypted kernel information decrypted with KEY1 (referred to as "KEY1-decrypted encrypted kernel information").

The KIMC driver 124 calculates (at 310) reference cryptographic digests by applying a cryptographic hash function on the pieces of the KEY1-decrypted encrypted kernel information. In some examples, after calculating the reference cryptographic digests, the KIMC driver 124 can remove (at 312) the physical-alias page table 138.

The KIMC driver 124 writes (at 314) the reference cryptographic digests to the buffer 160 (FIG. 1). The reference cryptographic digests are added to the buffer 160 along with physical addresses associated with the reference cryptographic digests and the size of each reference cryptographic digest. The KIMC 130 may be triggered to read the buffer 160 in response to an indication from the KIMC driver 124 that the buffer 160 has been populated with reference cryptographic digests.

The KIMC driver 124 programs (at 316) the IOMMU page table 142 by adding entries mapping device virtual addresses to respective kernel physical addresses (such as entries shown in Table 5 below).

TABLE 5

| (IOMMU Page Table) | | |
|---|---|---|
| I/O Virtual Page | Physical Page | I/O Key Identifier |
| Device Virtual Address A | Kernel Physical Address 1 | KEY_ID1 |
| Device Virtual Address B | Kernel Physical Address 2 | KEY_ID1 |
| | . . . | |

As part of adding entries to the IOMMU page table 142, the KIMC driver 124 also sets (at 318) the I/O key identifier in each added entry for indicating that the content of the memory page represented by the added entry is read-only and encrypted with the encryption key identified by KEY_ID1.

When the KIMC 130 reads encrypted kernel information using device virtual addresses, the IOMMU 140 decrypts the encrypted kernel information using KEY1 in a DMA transfer. As a result, KEY1-decrypted encrypted kernel information is returned to the KIMC 130, to allow the kernel integrity scanner 136 to calculate cryptographic digests based on the KEY1-decrypted encrypted kernel information for comparison to the reference cryptographic digests received from the buffer 160.

Encrypted VMs

Figure 4:
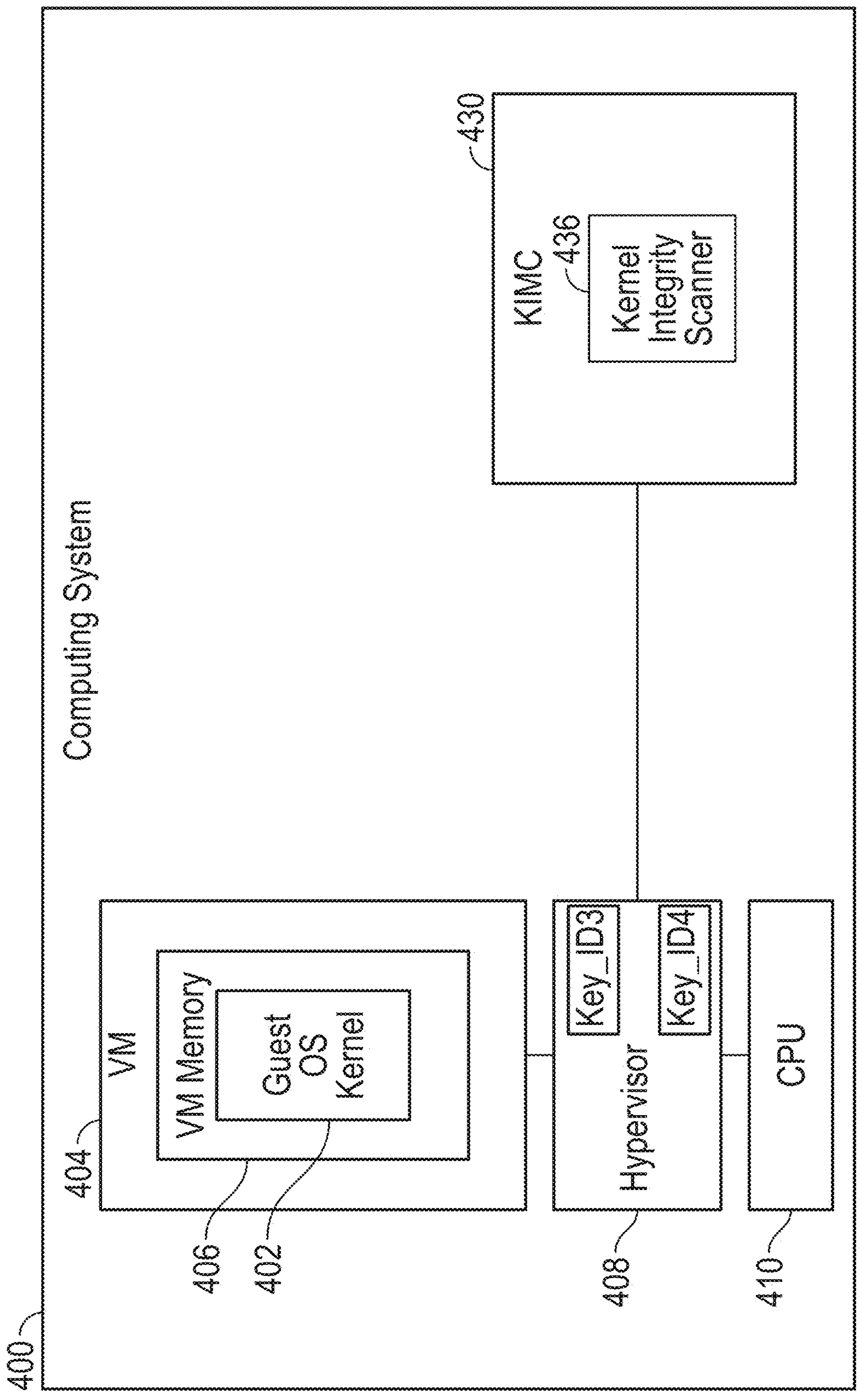
FIG. 4 is a block diagram of a computing system including a KIMC for verifying kernel integrity based on encrypted OS information in a virtual machine (VM) memory, in accordance with some examples.

In further examples, as shown in FIG. 4, a computing system 400 includes a KIMC 430. A kernel integrity scanner 436 of the KIMC 430 may be used to monitor the integrity of a guest OS kernel 402 run in a virtual machine (VM) 404 (or guest OS kernels in multiple respective VMs). The guest OS kernel 402 is stored in a VM memory 406 of the VM 404. The guest OS kernel 402 can include similar components as the OS kernel 114 of FIG. 1. In examples according to FIG. 4, the kernel integrity scanner 436 can use a hypervisor 408 to monitor the guest OS kernel in the VM. More specifically, the kernel integrity scanner 436 can use an application programming interface (API) of the hypervisor 408 to monitor the guest OS kernel 402 in the VM 404. The hypervisor 408 manages the creation and management of VMs, and the hypervisor 408 emulates hardware of a computing system for each VM.

Instead of using DMA to read the VM memory 406, the kernel integrity scanner 436 relies on the hypervisor 408 to provide access to the VM memory 406 and translate a guest physical address provided by a KIMC driver of the guest OS kernel to a host physical address or a host virtual address. A "host" address (physical or virtual address) is used by a host OS or the hypervisor, while a guest physical address is used by the guest OS kernel.

Memory encryption can be applied to the VM memory 406. In some examples of the present disclosure, techniques discussed above for encrypted kernel information and encrypted I/O can be applied for encrypted VMs. For example, the hypervisor 408 may specify use of a first key identifier (e.g., KEY_ID3 to identify an encryption key, KEY3) to encrypt a guest physical page (provided by the guest OS kernel) of the VM memory 406. KEY3 is analogous to KEY0 discussed above for encrypting kernel information in the system memory 112. Note that while the hypervisor 408 allocates a key identifier, a CPU 410 on which the hypervisor 408 executes performs the encryption and decryption of pages of the VM memory 406 using the identified encryption key. The VM 404 is also executed by the CPU 410.

The hypervisor 408 may also specify use of a second key identifier (e.g., KEY_ID4 to identify an encryption key, KEY4) to encrypt a shared memory page that is shared between the hypervisor 408 and the VM 404. The second key identifier encrypts data in the shared memory page that is used to communicate the data between the hypervisor 408 and the VM 404. KEY4 is analogous to KEY1 discussed above for encrypted I/O.

The second key identifier specified by the hypervisor 408 for the shared memory page is another example of an EDI, in the sense that the second key identifier provides an indication that a memory page is encrypted and decrypted with the second key (e.g., KEY4) identified by the second key identifier, but encryption and decryption with the first encryption key (e.g., KEY3) are disabled during store and load operations of the memory page.

The specification of the second key identifier allows the kernel integrity scanner 436 to scan a VM's guest physical page without decrypting the content of the VM's guest physical page with the first key identifier.

Further Examples

Figure 5:
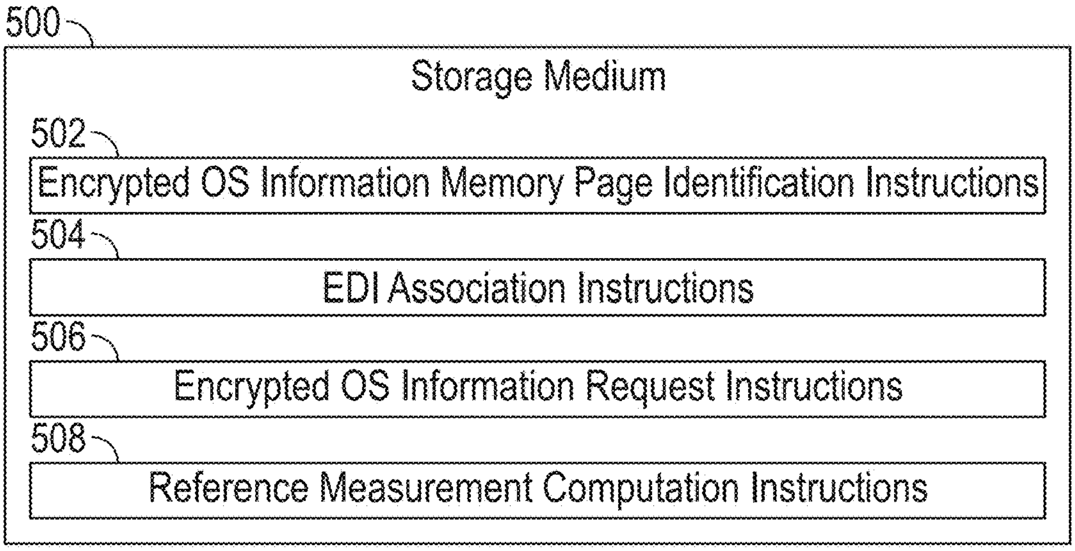
FIG. 5 is a block diagram of a storage medium storing machine-readable instructions according to some examples.

FIG. 5 is a block diagram of a non-transitory machine-readable or computer-readable storage medium 500 storing machine-readable instructions that upon execution cause a system to perform various tasks. The system may include one or more computers.

The machine-readable instructions include encrypted OS information memory page identification instructions 502 to identify a memory page containing encrypted OS information that is to be subjected to integrity monitoring, where the encrypted OS information is encrypted with a first key (e.g., KEY0). The encrypted OS information can include the encrypted kernel information, such as the kernel code 118, the kernel read-only data 120, and/or the kernel modules 122.

The machine-readable instructions include EDI association instructions 504 to associate an EDI with the memory page. The EDI may indicate that the content of the memory page is unencrypted (i.e., not encrypted with any encryption key). Alternatively, the EDI may include a second key (different from the first key) used for I/O encryption.

The machine-readable instructions include encrypted OS information request instructions 506 to request the encrypted OS information from the memory page, where the request is to cause a CPU to read the encrypted OS information from the memory page, and the EDI is to cause the CPU to refrain from decrypting the encrypted OS information using the first key when reading the encrypted OS information from the memory page.

The machine-readable instructions include reference measurement computation instructions 508 to compute a reference measurement value based on the encrypted OS information read by the CPU from the memory page without decryption using the first key, the reference measurement value for use in the integrity monitoring. In some examples, the reference measurement value includes a cryptographic digest derived by applying a cryptographic hash function on the encrypted OS information.

In some examples, the machine-readable instructions can store the reference measurement value in a buffer (e.g., 160 in FIG. 1) for access by a scanner device that performs integrity monitoring of the encrypted OS information in the memory page. An example of the scanner device is the KIMC 130 of FIG. 1.

In some examples, the machine-readable instructions can program information associated with a MMU to enable a DMA transfer of the memory page by the scanner device over a bus. An example of the MMU is the IOMMU 140 of FIG. 1. The programmed information can include the IOMMU page table 142, for example.

In some examples, the programming of the information associated with the MMU includes programming a page table of the MMU to indicate that the memory page is not to be decrypted with the first key when reading the memory page in a DMA transfer.

In some examples, the encrypted OS information is read by the scanner device in the DMA transfer for computing a measurement value to compare to the reference measurement value.

In some examples, the machine-readable instructions can add the EDI in an entry of mapping information that maps a virtual address to a physical address of the memory page. The requesting of the encrypted OS information from the memory page includes requesting the encrypted OS information at the virtual address. An example of the mapping information is the physical-alias page table 138 of FIG. 1. The mapping information may map alias virtual addresses (that are aliases of kernel virtual addresses) to physical addresses of memory pages.

In some examples, requesting the encrypted OS information using an alias virtual address of a memory page causes the CPU to refrain from decrypting the memory page using the first key. However, requesting the encrypted OS information using the kernel virtual address causes the CPU to decrypt the encrypted OS information using the first key when reading the encrypted OS information from the memory page.

In some examples, the EDI indicates that the content of the memory page is encrypted with a second key (e.g., KEY1 for encrypted I/O) different from the first key. The EDI causes the CPU to decrypt the encrypted OS information read from the memory page using the second key but to refrain from decrypting the encrypted OS information using the first key when reading the encrypted OS information from the memory page.

In some examples, the decryption of the encrypted OS information read from the memory page using the second key occurs during a DMA transfer by a scanner device to perform the integrity monitoring.

In some examples, the reference measurement value is based on a decrypted version of the encrypted OS information as decrypted with the second key.

Figure 6:
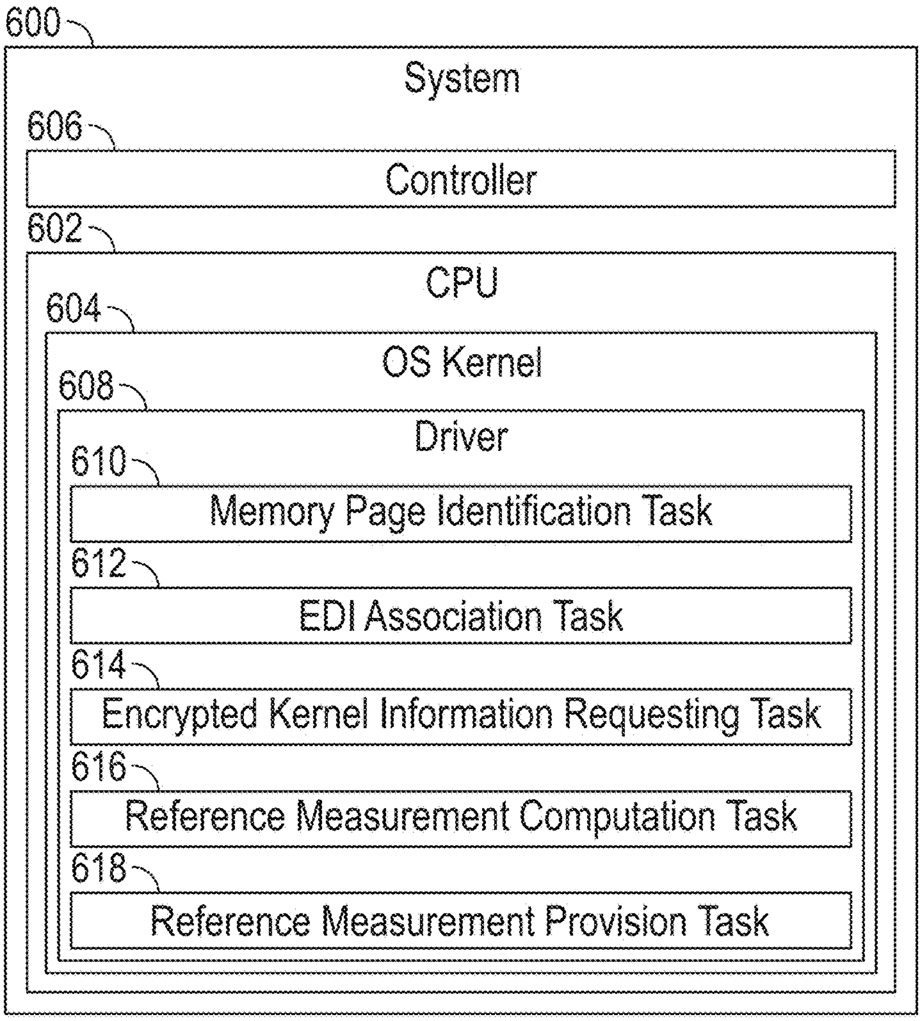
FIG. 6 is a block diagram of a system according to some examples.

FIG. 6 is a block diagram of a system 600, which includes a CPU 602 to execute an OS kernel 604. The system 600 further includes a controller 606 to perform integrity monitoring of encrypted kernel information of the OS kernel, the encrypted kernel information encrypted with a first key, The OS kernel 604 includes a driver 608 executable by the CPU 602 to perform various tasks. The tasks of the driver 608 include a memory page identification task 610 to identify a memory page containing the encrypted kernel information. For example, the identifying of the memory page can include the determining (at 202) in FIG. 2.

The tasks of the driver 608 include an EDI association task 612 to associate an EDI with the memory page. For example, this association can be based on adding the EDI to mapping information that maps alias virtual addresses to kernel physical addresses.

The tasks of the driver 608 include an encrypted kernel information requesting task 614 to request the encrypted kernel information from the memory page, where the request is to cause the CPU to read the encrypted kernel information from the memory page, and the EDI is to cause the CPU to refrain from decrypting the encrypted kernel information using the first key when reading the encrypted kernel information from the memory page.

The tasks of the driver 608 include a reference measurement computation task 616 to compute a reference measurement value based on the encrypted kernel information read by the CPU from the memory page without decryption using the first key. The reference measurement value can include a reference cryptographic digest, for example.

The tasks of the driver 608 include a reference measurement provision task 618 to provide the reference measurement value to the controller 606. For example, the reference measurement provision task 618 can write the reference measurement value to a buffer, such as the buffer 160 of FIG. 1, that is accessible to the controller 606.

In some examples, the OS kernel is part of a guest OS in a VM. The memory page is a memory page of the VM, and the EDI includes a second key used to encrypt a shared memory page between the VM and a hypervisor.

Figure 7:
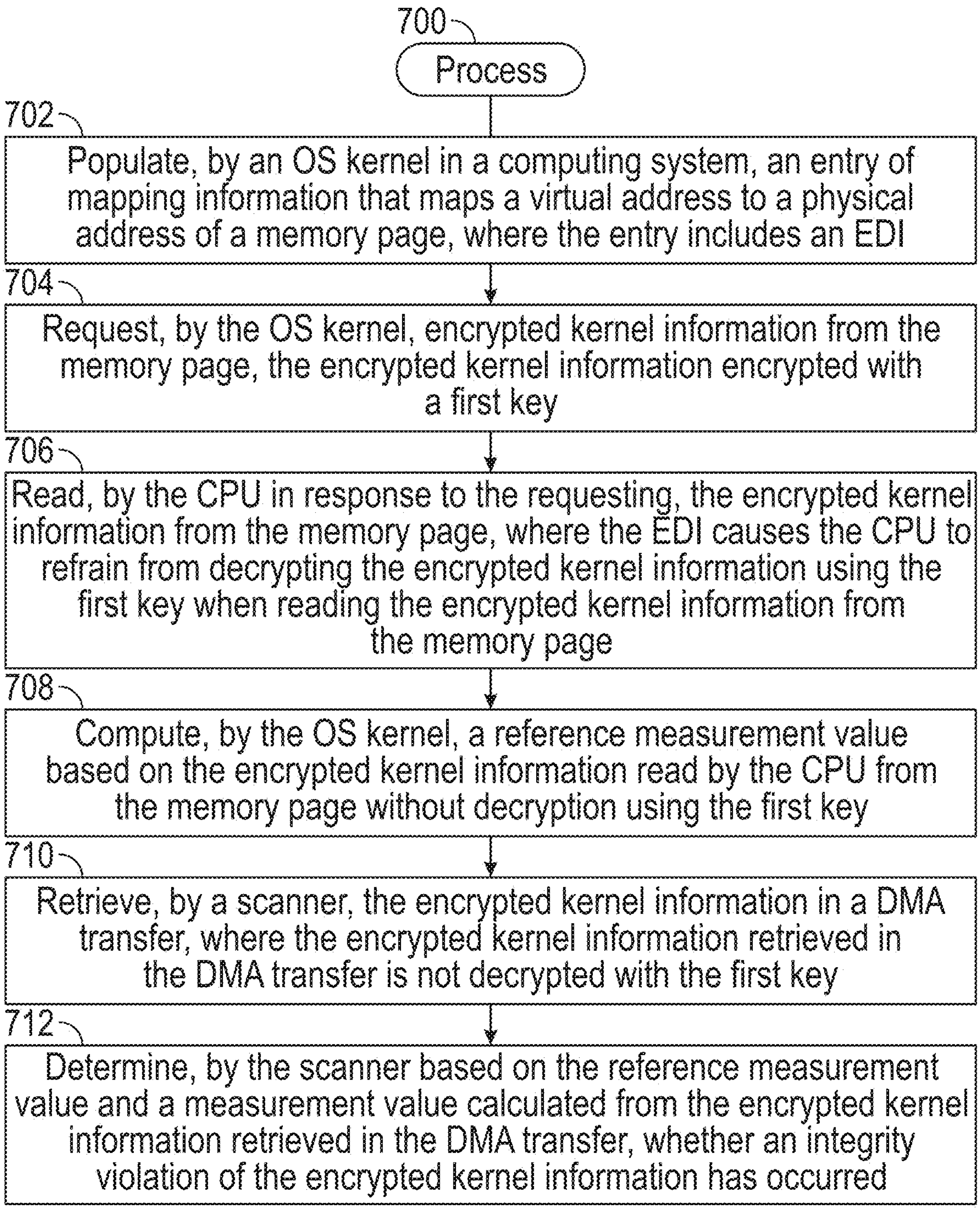
FIG. 7 is a flow diagram of a process according to some examples.

FIG. 7 is a flow diagram of a process 700 according to some examples of the present disclosure. The process 700 includes populating (at 702), by an OS kernel in a computing system, an entry of mapping information that maps a virtual address to a physical address of a memory page, where the entry includes an EDI. The mapping information may map alias virtual addresses (which are aliases of kernel virtual addresses) to physical addresses of memory pages containing kernel information. An example of the mapping information includes the physical-alias page table 138 of FIG. 1.

The process 700 includes requesting (at 704), by the OS kernel, encrypted kernel information from the memory page, the encrypted kernel information encrypted with a first key.

The process 700 includes reading (at 706), by the CPU in response to the requesting, the encrypted kernel information from the memory page, where the EDI causes the CPU to refrain from decrypting the encrypted kernel information using the first key when reading the encrypted kernel information from the memory page.

The process 700 includes computing (at 708), by the OS kernel, a reference measurement value based on the encrypted kernel information read by the CPU from the memory page without decryption using the first key.

The process 700 includes retrieving (at 710), by a scanner, the encrypted kernel information in a DMA transfer, where the encrypted kernel information retrieved in the DMA transfer is not decrypted with the first key. The scanner may be part of the KIMC 130 of FIG. 1.

The process 700 includes determining (at 712), by the scanner based on the reference measurement value and a measurement value calculated from the encrypted kernel information retrieved in the DMA transfer, whether an integrity violation of the encrypted kernel information has occurred.

A memory device can include any or some combination of the following: a dynamic or static random access memory (a DRAM or SRAM) device, an erasable and programmable read-only memory (EPROM) device, an electrically erasable and programmable read-only memory (EEPROM) device, or a flash memory device.

A CPU can include one or more hardware processors. A hardware processor can include a microprocessor, a core of a multi-core microprocessor, a microcontroller, a programmable integrated circuit, a programmable gate array, or another hardware processing circuit.

FIGS. 2, 3, and 7 show processes with tasks in specific orders. In other examples, the tasks may be performed in a different order, some tasks may be omitted, and other tasks may be added.

A "BMC" can refer to a specialized service controller that monitors the physical state of a system using sensors and communicates with a remote management system (that is remote from the system) through an independent "out-of-band" connection. The BMC can perform management tasks to manage components of the system. Examples of management tasks that can be performed by the BMC can include any or some combination of the following: power control to perform power management of the system (such as to transition the system between different power consumption states in response to detected events), thermal monitoring and control of the system (such as to monitor temperatures of the system and to control thermal management states of the system), fan control of fans in the system, system health monitoring based on monitoring measurement data from various sensors of the system, remote access of the system (to access the computer system over a network, for example), remote reboot of the system (to trigger the computer system to reboot using a remote command), system setup and deployment of the system, system security to implement security procedures in the system, and so forth.

In some examples, the BMC can provide so-called "lights-out" functionality for the system. The lights out functionality may allow a user, such as a systems administrator, to perform management operations on the system even if an OS is not installed or not functional on the system.

Moreover, in some examples, the BMC can run on auxiliary power provided by an auxiliary power source; as a result, the system does not have to be powered on to allow the BMC to perform the BMC's operations. The auxiliary power source is separate from a primary power supply that supplies powers to other components (e.g., a main processor, a memory, an I/O device, etc.) of the system.

A "controller" can refer to one or more hardware processing circuits, which can include any or some combination of a microprocessor, a core of a multi-core microprocessor, a microcontroller, a programmable integrated circuit, a programmable gate array, or another hardware processing circuit. Alternatively, a "controller" can refer to a combination of one or more hardware processing circuits and machine-readable instructions (software and/or firmware) executable on the one or more hardware processing circuits.

A storage medium (e.g., 500 in FIG. 5) can include any or some combination of the following: a semiconductor memory device such as a DRAM or SRAM device, an EPROM device, an EEPROM device, or a flash memory device; a magnetic disk such as a fixed, floppy and removable disk; another magnetic medium including tape; an optical medium such as a compact disk (CD) or a digital video disk (DVD); or another type of storage device. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In the present disclosure, use of the term "a," "an," or "the" is intended to include the plural forms as well, unless the context clearly indicates otherwise. Also, the term "includes," "including," "comprises," "comprising," "have," or "having" when used in this disclosure specifies the presence of the stated elements, but do not preclude the presence or addition of other elements.

In the foregoing description, numerous details are set forth to provide an understanding of the subject disclosed herein. However, implementations may be practiced without some of these details. Other implementations may include modifications and variations from the details discussed above. It is intended that the appended claims cover such modifications and variations.

What is claimed is:

1. A non-transitory machine-readable storage medium comprising instructions that upon execution cause a system to:

identify a memory page containing encrypted operating system (OS) information that is to be subjected to integrity monitoring, the encrypted OS information encrypted with a first key;

associate an encryption disabled indicator (EDI) with the memory page;

include the EDI in an entry of mapping information that maps a virtual address to a physical address of the memory page, wherein the virtual address is an alias of a kernel virtual address mapped to the physical address of the memory page;

request the encrypted OS information from the memory page at the virtual address, wherein the request is to cause a central processing unit (CPU) to read the encrypted OS information from the memory page, and the EDI is to cause the CPU to refrain from decrypting the encrypted OS information using the first key when reading the encrypted OS information from the memory page, wherein a request of the encrypted OS information at the kernel virtual address causes the CPU to decrypt the encrypted OS information using the first key when reading the encrypted OS information from the memory page; and compute a reference measurement value based on the encrypted OS information read by the CPU from the memory page without decryption using the first key, the reference measurement value for use in the integrity monitoring.

2. The non-transitory machine-readable storage medium of claim 1, wherein the EDI indicates that a content of the memory page is encrypted with a second key different from the first key, and wherein the EDI is to cause the CPU to decrypt the encrypted OS information read from the memory page using the second key but to refrain from decrypting the encrypted OS information using the first key when reading the encrypted OS information from the memory page.

3. The non-transitory machine-readable storage medium of claim 2, wherein the decryption of the encrypted OS information read from the memory page using the second key occurs during a direct memory access (DMA) transfer by a scanner device to perform the integrity monitoring.

4. The non-transitory machine-readable storage medium of claim 2, wherein the reference measurement value is based on a decrypted version of the encrypted OS information as decrypted with the second key.

5. The non-transitory machine-readable storage medium of claim 1, wherein the encrypted OS information is for an OS kernel of a guest operating system (OS) in a virtual machine (VM), wherein the memory page is in a VM memory, and wherein the EDI comprises a second key used to encrypt a shared memory page between the VM and a hypervisor.

6. The non-transitory machine-readable storage medium of claim 1, wherein the instructions upon execution cause the system to:

store the reference measurement value in a buffer for access by a scanner device that performs integrity monitoring of the encrypted OS information in the memory page.

7. The non-transitory machine-readable storage medium of claim 6, wherein the instructions upon execution cause the system to:

program information associated with a memory management unit to enable a direct memory access (DMA) of the memory page by the scanner device over a bus.

8. The non-transitory machine-readable storage medium of claim 7, wherein the programming of the information associated with the memory management unit comprises programming a page table of the memory management unit to indicate that the memory page is not to be decrypted with the first key when reading the memory page in a DMA transfer.

9. The non-transitory machine-readable storage medium of claim 8, wherein the encrypted OS information is read by the scanner device in the DMA transfer for computing a measurement value to compare to the reference measurement value.

10. The non-transitory machine-readable storage medium of claim 7, wherein the memory management unit is an input/output memory management unit (IOMMU).

11. A system comprising:

a central processing unit (CPU) to execute an operating system (OS) kernel;

a controller to perform integrity monitoring of encrypted kernel information of the OS kernel, the encrypted kernel information encrypted with a first key, wherein the OS kernel comprises a driver executable by the CPU to:

identify a memory page containing the encrypted kernel information;

associate an encryption disabled indicator (EDI) with the memory page;

include the EDI in an entry of mapping information that maps a virtual address to a physical address of the memory page, the EDI indicating that encryption of content of the memory page using the first key is disabled even though the encrypted kernel information in the memory page is encrypted;

request the encrypted kernel information from the memory page, wherein the CPU is to:

respond to the request by reading the encrypted kernel information from the memory page, and based on the EDI in the entry of the mapping information, refrain from decrypting the encrypted kernel information using the first key when reading the encrypted kernel information from the memory page, wherein the driver is executable by the CPU to:

compute a reference measurement value based on the encrypted kernel information read by the CPU from the memory page without decryption using the first key; and provide the reference measurement value to the controller.

12. The system of claim 11, wherein the OS kernel is part of a guest operating system (OS) in a virtual machine (VM), wherein the memory page is in a VM memory, and wherein the EDI comprises a second key used to encrypt a shared memory page between the VM and a hypervisor.

13. The system of claim 11, wherein the driver is executable by the CPU to:

program information associated with a memory management unit to enable a direct memory access (DMA) of the memory page by the controller over a bus.

14. The system of claim 13, wherein the controller is to:

read the encrypted kernel information in a DMA transfer over the bus;

calculate a measurement value based on the encrypted kernel information read in the DMA transfer; and compare the calculated measurement value to the reference measurement value.

15. The system of claim 14, wherein the programming of the information associated with the memory management unit comprises programming a page table of the memory management unit to indicate that the memory page is not to be decrypted with the first key when reading the memory page in a DMA transfer.

16. The system of claim 11, wherein the requesting of the encrypted kernel information from the memory page comprises requesting the encrypted kernel information at the virtual address, wherein the virtual address is an alias of a kernel virtual address mapped to the physical address of the memory page, and wherein a request of the encrypted kernel information at the kernel virtual address causes the CPU to decrypt the encrypted kernel information using the first key when reading the encrypted kernel information from the memory page.

17. A method comprising:

populating, by an operating system (OS) kernel in a computing system comprising a central processing unit (CPU), an entry of mapping information that maps a virtual address to a physical address of a memory page, wherein the entry comprises an encryption disabled indicator (EDI), the EDI indicates that encryption of content of the memory page using a first key is disabled even though encrypted kernel information in the memory page is encrypted;

requesting, by the OS kernel, the encrypted kernel information from the memory page, the encrypted kernel information encrypted with the first key;

reading, by the CPU in response to the requesting, the encrypted kernel information from the memory page, wherein the EDI causes the CPU to refrain from decrypting the encrypted kernel information using the first key when reading the encrypted kernel information from the memory page;

computing, by the OS kernel, a reference measurement value based on the encrypted kernel information read by the CPU from the memory page without decryption using the first key;

retrieving, by a scanner, the encrypted kernel information in a direct memory access (DMA) transfer, wherein the encrypted kernel information retrieved in the DMA transfer is not decrypted with the first key; and determining, by the scanner based on the reference measurement value and a measurement value calculated from the encrypted kernel information retrieved in the DMA transfer, whether an integrity violation of the encrypted kernel information has occurred.

18. The method of claim 17, wherein the EDI indicates:

encryption and decryption of content of the memory page are disabled during store and load operations, or a second key used for input/output (I/O) encryption.

19. The method of claim 17, wherein the requesting of the encrypted kernel information from the memory page comprises requesting the encrypted kernel information at the virtual address, wherein the virtual address is an alias of a kernel virtual address mapped to the physical address of the memory page, and wherein a request of the encrypted kernel information at the kernel virtual address causes the CPU to decrypt the encrypted kernel information using the first key when reading the encrypted kernel information from the memory page.

* * * * *